(12) United States Patent
Vivien

(10) Patent No.: US 10,735,561 B2
(45) Date of Patent: Aug. 4, 2020

(54) DEVICE AND METHOD FOR PROVIDING SERVICES IN A COMMUNICATION NETWORK

(71) Applicant: SAGEMCOM BROADBAND SAS, Rueil-Malmaison (FR)

(72) Inventor: Nicolas Vivien, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 14/419,963

(22) PCT Filed: Jul. 19, 2013

(86) PCT No.: PCT/EP2013/065257
§ 371 (c)(1),
(2) Date: Feb. 6, 2015

(87) PCT Pub. No.: WO2014/023550
PCT Pub. Date: Feb. 13, 2014

(65) Prior Publication Data
US 2015/0222732 A1 Aug. 6, 2015

(30) Foreign Application Priority Data
Aug. 8, 2012 (FR) .................. 12 57706

(51) Int. Cl.
*H04L 29/06* (2006.01)
*H04L 29/08* (2006.01)

(52) U.S. Cl.
CPC .............. *H04L 67/42* (2013.01); *H04L 67/10* (2013.01); *H04L 67/16* (2013.01); *H04L 69/08* (2013.01)

(58) Field of Classification Search
CPC .......... H04L 67/10; H04L 67/42; H04L 67/16
(Continued)

(56) References Cited

U.S. PATENT DOCUMENTS 6,970,919 B1 * 11/2005 Doi .................... H04L 41/0631 345/440
7,171,475 B2 * 1/2007 Weisman .............. G06F 9/4411 709/204

(Continued)

FOREIGN PATENT DOCUMENTS

EP 2444925 A1 4/2012
WO 2008/086504 A2 7/2008

OTHER PUBLICATIONS

"Protocols for Service Discovery in Dynamic and Mobile Networks"—Lee et al, Computer and Information Science and Engineering Dept., International Journal of Computer Research, vol. 11, No. 1, Jul. 2000 https://pdfs.semanticscholar.org/ddd6/21064aad1b434b3ec170c517601ae88780f0.pdf.*

(Continued)

*Primary Examiner* — Randy A Scott
(74) *Attorney, Agent, or Firm* — Oliff PLC; R. Brian Drozd

(57) ABSTRACT

A device, such as a residential gateway, is intended to provide at least one service, in a communication network, to at least one client connected to the communication network. The device may be configured for: obtaining a client type for each client; and exporting a service description describing at least one service from among said service(s). For obtaining said service description, the device may be configured for selecting each service described by said description depending on the type of at least one respective client to which said description is intended to be exported.

12 Claims, 3 Drawing Sheets

Figure 1A:
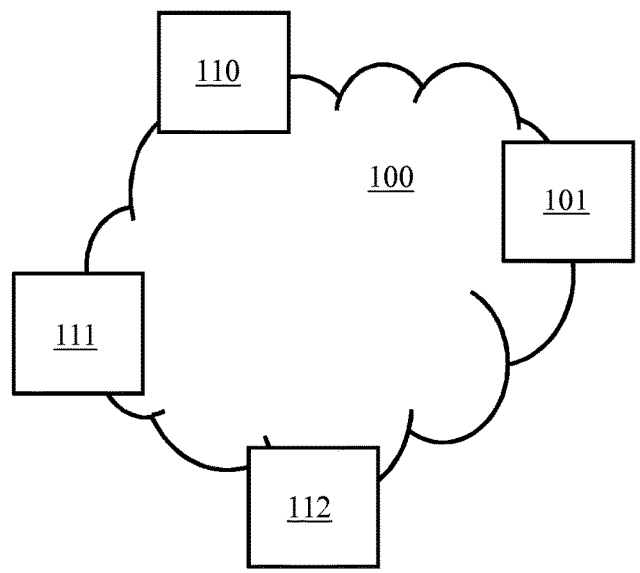

(58) Field of Classification Search
USPC ........ 709/203, 204, 205, 206, 207; 370/235, 370/252, 412
See application file for complete search history.

(56) References Cited

U.S. PATENT DOCUMENTS

| | | | | |
|---|---|---|---|---|
| 8,180,891 | B1* | 5/2012 | Harrison | H04L 63/10 709/224 |
| 2002/0112058 | A1* | 8/2002 | Weisman | G06F 9/4411 709/227 |
| 2005/0114520 | A1* | 5/2005 | White | H04L 63/0209 709/228 |
| 2007/0118496 | A1* | 5/2007 | Bornhoevd | H04L 67/327 |
| 2007/0293185 | A1* | 12/2007 | Hwang | H04L 43/0823 455/403 |
| 2008/0033845 | A1* | 2/2008 | McBride | G06Q 10/087 705/28 |
| 2008/0059605 | A1* | 3/2008 | Shalev | H04L 12/2814 709/217 |
| 2010/0293299 | A1* | 11/2010 | Stokking | H04L 12/2807 709/249 |
| 2011/0153790 | A1 | 6/2011 | Yoon | |
| 2011/0216753 | A1* | 9/2011 | Kneckt | H04L 45/70 370/338 |
| 2012/0276867 | A1* | 11/2012 | McNamee | H04L 12/1407 455/406 |
| 2012/0324541 | A1* | 12/2012 | Palacios Valverde | H04L 12/2809 726/4 |
| 2013/0301431 | A1* | 11/2013 | Izzo | H04L 41/5067 370/252 |

OTHER PUBLICATIONS

"Simple Service Discovery Protocol/1.0"—Goland et al, Microsoft Corp., Oct. 28, 1999 https://tools.ietf.org/html/draft-cai-ssdp-v1-03 (Year: 1999).*

Sep. 20, 2013 Search Report issued in International Application No. PCT/EP2013/065257.

Translation of Feb. 19, 2015 International Preliminary Report on Patentability issued in International Application No. PCT/EP2013/065257.

* cited by examiner

DEVICE AND METHOD FOR PROVIDING SERVICES IN A COMMUNICATION NETWORK

The present invention concerns the provision, in a communication network, of at least one service to at least one client connected to said communication network.

So as to simplify the automatic putting in communication of devices via a communication network, and so as to reinforce interoperability of these devices, there exist protocols in which devices announce, on their own or upon request, each service that they provide via the communication network.

For example, one can note the SMB (Server Message Block) or CFIS (Common Internet File System) protocol, which enable sharing resources, such as printers or directories, via communication networks. On the basis of the NETBIOS (Network Basic Input/Output System) over TCP/IP (Transmission Control Protocol over Internet Protocol) protocol, as defined in the standard documents RFC 1001 and RFC 1002, devices announce the services, for example print services, that they provide via the communication network. This principle is referred to as browsing in the context of the NETBIOS over TCP/IP protocol.

One can also note the AirPlay (registered trademark) solution from the company Apple Inc., in which devices publish the services that they provide via the communication network, using the mDNS-SD (Multicast Domain Name System-Service Discovery) protocol.

Finally, one can note the UPnP (Universal Plug n' Play) protocol promulgated by the UPnP Forum, based on the use of the SSDP (Simple Service Discovery Protocol) protocol for announcing the provision of services via the communication network.

The term service refers to a set of functionalities that are provided, by a device in a communication network, to other devices in the communication network, as well as a set of rules controlling use thereof.

However, such announcements, upon request or not, enable clients to access services to which they should a priori not have access. In particular some software present on personal computers (PCs) connected to LANs (Local Area Networks) such as Peer-to-Peer downloading software, profit from the fact that the residential gateway services are announced on the LAN network in order to access these services so as to modify the firewall rules and enable a station beyond the gateway to be able to access another station on the LAN network. This creates a breach of security that it is necessary to overcome.

In addition, such announcements, upon request or not, enable a user to access services by means of clients that may not be suited to the management of these services. Indeed, these announcements being automatically implemented, the user can access these services via a client not having the entire interface necessary for enabling the user to measure the impact of configurations or reconfigurations of functionalities relating to these services.

It is therefore desirable to overcome these drawbacks of the prior art.

The invention concerns a device intended to provide at least one service, in a first communication network, to at least one client connected to said first communication network. The device is such that it comprises: means for obtaining, for each client, a type of client; and means for exporting a service description describing at least one service from said service(s). For obtaining said service description, said device comprises means for selecting each service described by said description according to the type of at least one respective client to which said description is intended to be exported. Thus, by exporting to a client only the services to which the type of the client corresponds, the security of the first communication network and the operational efficiency of the device are reinforced.

According to a particular embodiment, the device comprises means for building said description according to predetermined rules associating, for a type of client, at least one service among said service(s).

According to a particular embodiment, the device comprises: means for determining the type of each client connected to the first communication network; means for determining, according to said predetermined rules, each service associated with all the types of the clients connected to the first communication network; means for building said service description, said service description being limited to said determined service(s); and means for broadcasting, via the first communication network, the built service description. Thus the device announces only the services corresponding commonly to all the clients present on the first communication network.

According to a particular embodiment, the device comprises: means for receiving an access request for accessing to one said service; means for determining the type of client that sent said access request; and means for deciding to authorise or not access to said service for said client, according to said predetermined rules and said type of said client. Thus, if a client attempts to access a service that does not correspond to its type, its request is rejected.

According to a particular embodiment, the device comprises: means for receiving a service deactivation request for deactivating the services provided by said device; means for determining the type of the client that sent said service deactivation request; and means for deactivating, in response to said service deactivation request, the services associated, according to said predetermined rules, with said type of said client. Thus the deactivation of the services may be only partial. As a client may require a deactivation of all the services, since it has knowledge only of the services to which its type corresponds, this allows keeping the other services active for other clients.

According to a particular embodiment, the device comprises: means for receiving a request of service description; means for determining the type of the client that sent said request of service description; means for building said service description according to said type of the client; and means for transmitting the built service description, in response to said request. Thus, upon request from a client, the device adapts the description of services to those that correspond to the type of this client.

According to a particular embodiment, the means for obtaining, for each client, the type of the client are adapted to determine the type of at least one client according to: MAC addresses in Ethernet frames exchanged via the first communication network; and/or options included in DHCP messages exchanged via the first communication network; and/or sequences of frames exchanged via the first communication network. Thus this allows automatic configuration.

According to a particular embodiment, the device is an interconnection device or is intended to be integrated in an interconnection device, said interconnection device being intended to interconnect said first communication network with a second communication network, each service relating to an interface of said interconnection device with said second communication network. Thus this allows limiting undesirable reconfigurations of the interfaces of the interconnection device, such as for example the physical or logic interfaces with the Internet of a residential gateway.

According to a particular embodiment, the device comprises means for receiving, via the second communication network, information indicating the type of at least one client connected to said first communication network. Thus the automatic configuration of the management of the services by the device is improved.

According to a particular embodiment, said services are in accordance with the UPnP standard.

The invention also concerns a method for providing at least one service, in a communication network, to at least one client connected to said communication network. The method is such that a device performs the following steps: obtaining, for each client, a type of client; exporting a service description describing at least one service among said service(s); and, for obtaining said service description, selecting each service described by said description according to the type of at least one respective client to which said description is intended to be exported.

The invention also concerns a computer program, which may be stored on a medium and/or downloaded from a communication network, in order to be read by a processor. This computer program comprises instructions for implementing any of the methods mentioned above, when said program is executed by the processor. The invention also concerns storage means comprising such a computer program.

Figure 1B:
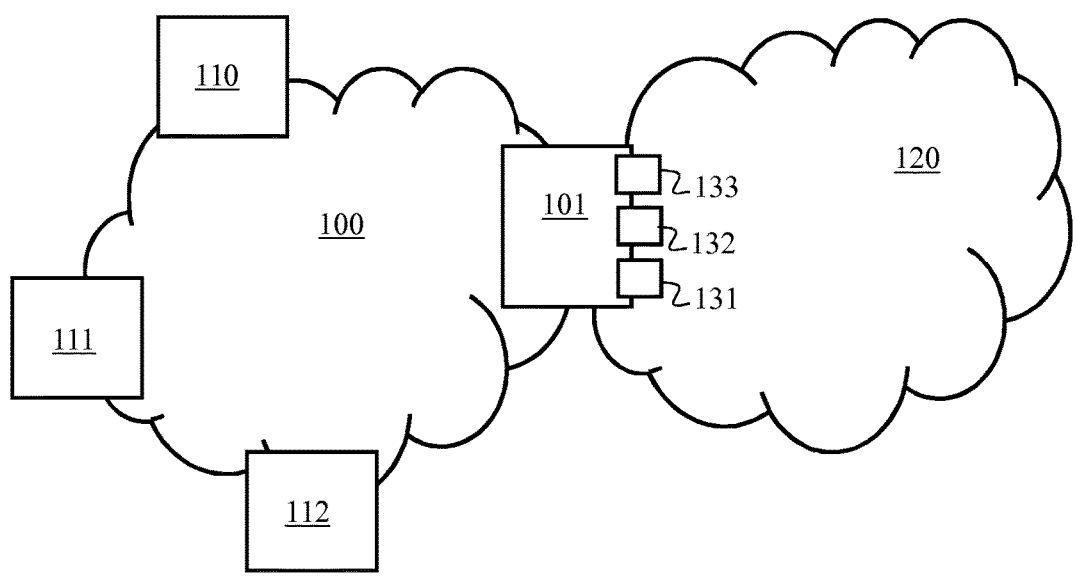
Figure 2:
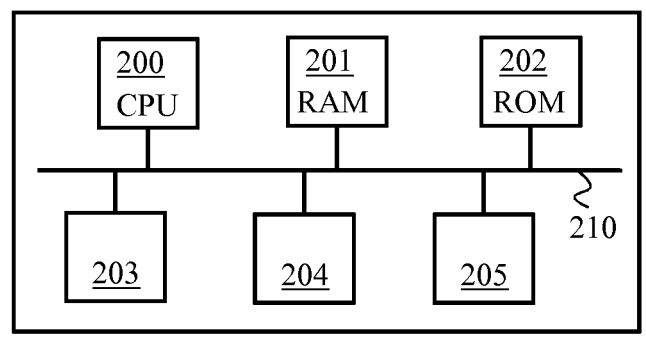
Figure 3:
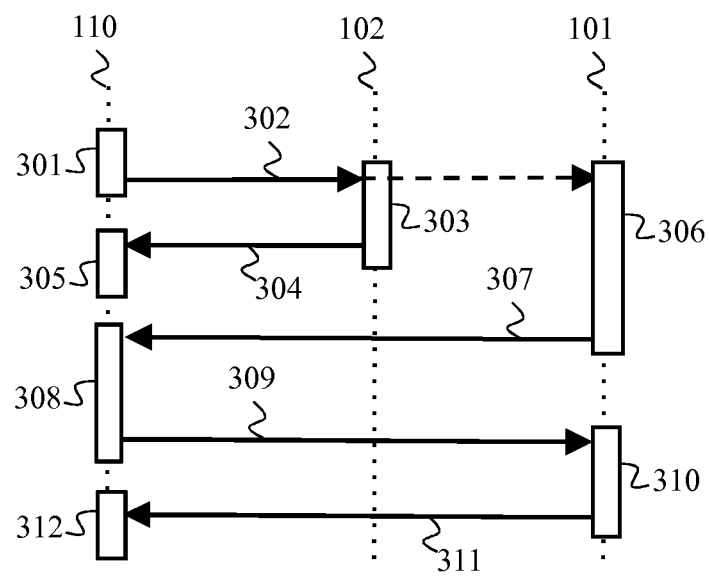
Figure 4:
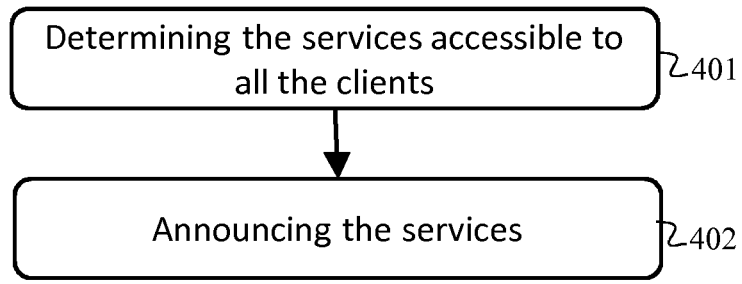
Figure 5:
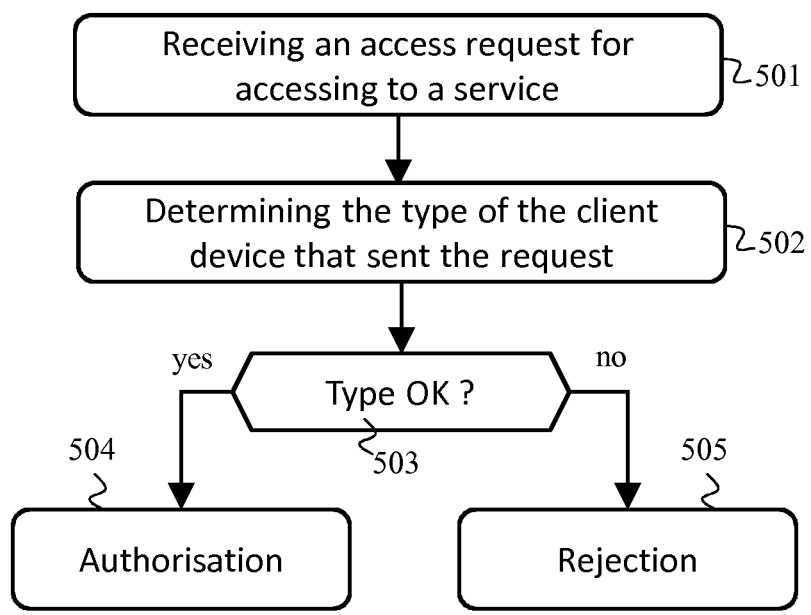

The features of the invention mentioned above, as well as others, will emerge more clearly from a reading of the following description of an example embodiment, said description being given in relation to the accompanying drawings, among which:

FIG. 1A schematically illustrates a first system in which the invention may be implemented;

FIG. 1B schematically illustrates a second system in which the invention may be implemented;

FIG. 2 schematically illustrates an example of hardware architecture of a server of the system of FIG. 1A or 1B;

FIG. 3 schematically illustrates a message exchange occurring in the system of FIG. 1A or 1B;

FIG. 4 schematically illustrates a service announcement algorithm;

FIG. 5 schematically illustrates an algorithm for processing an access request for accessing to a service.

It is proposed that a service provider device can decide to export, to a client or set of clients, only a subset of services that it offers, this subset being selected according to the type of the client(s).

The type of a client represents functionalities implemented by this client.

Thus, when a client requires that the service provider device transmits thereto a description of the services that it offers, the service provider device establishes this list according to the type of the client. The client is then informed only of the services to which, according to predetermined rules within the service provider device, it is authorised to access. The same principle may be applied when the service provider device announces by itself to the client(s) the services that it offers. When several clients are concerned, the service provider device may include in the description of its services only those that are in common for the clients, according to said predetermined rules, from the respective types of the clients.

The remainder of the description relates more particularly to the exportation of service descriptions in the context of the UPnP protocol. It is however necessary to note that the principles set forth below can be implemented in the context of other announcement and service provision protocols, such as for example the SMB and mDNS-SD protocols already mentioned.

FIG. 1A schematically illustrates a first system in which the invention may be implemented.

The system comprises a service provider device 101, hereinafter referred to as server, providing at least one service via a communication network 100. The communication network 100 is preferentially a local network LAN. In a particular embodiment, the server 101 provides a plurality of services. Several servers can be implemented on the same hardware platform connected to the communication network 100. For example, a server according to the UPnP AV (Audio-Video) extension and a server according to the UPnP IGD (Internet Gateway Device) extension.

The system also comprises at least one client 110, 111, 112. Such clients are devices intended to benefit from services provided via the communication network 100 by servers, such as the server 101. In other words, the clients are intended to control execution of the services; moreover, in UPnP terminology, these clients are referred to as UPnP Control Points.

In order to enable the clients 110, 111, 112 to benefit from its services, the server 101 provides a description of services that it provides thereto. According to the exchange protocol in place between the server 101 and the clients 110, 11, 112, the server 101 provides such a description either upon request, or on its own, by broadcast. Exchanges in the context of the UPnP protocol are detailed hereafter in relation to FIG. 3.

FIG. 1B schematically illustrates a second system in which the invention may be implemented.

The system in FIG. 1B repeats the same elements as the system in FIG. 1A. However, the server 101 is, in the context of the system in FIG. 1B, an interconnection device or an element of such an interconnection device, the interconnection device interconnecting the communication network 100, referred to as first communication network, with a second communication network 120 via at least one interface 131, 132, 133. The interfaces 131, 132, 133 may be physical interfaces and/or logic interfaces. For example, the server 101 is a residential gateway for connecting a LAN network, corresponding to the first communication network 100, to the Internet, corresponding to the second communication network 120. In the case of this residential gateway, the interfaces 131, 132, 133 are for example defined as follows:

the interface 131, denoted TV, is dedicated to the transmission of television data via a contents delivery virtual network CDN (Content Delivery Network) managed by the operator providing access to the Internet with which the gateway is associated;

the interface 132, denoted TEL, is dedicated to the transmission of telephone data via a telephone virtual network over IP managed by the operator providing access to the Internet;

the interface 133, denoted DATA, is dedicated to the transmission of other data, such as for example the data coming from websites accessible via the Internet.

The server 101 then provides, via the first communication network 100, services that are associated with the interfaces 131, 132, 133. These are for example services of configuration of these interfaces, of definition of firewall rules relating to these interfaces, or more generally use of the these interfaces. So as not to allow to interfere with the services offered by these interfaces because of an undesirable configuration required by a client that is not concerned by these services, the server 101 selects the services exported to each of the clients. This allows ensuring for example that access to a service relating to the interface TV is not authorised for a PC. The behaviour of the server 101 is more particularly detailed hereafter in relation to FIGS. 3 and 5.

FIG. 2 schematically illustrates an example of architecture of the server 101, which then comprises, connected by a communication bus 210: a processor or CPU (Central Processing Unit) 200; a random access memory RAM 201; a read only memory ROM 202; a storage unit or a storage medium reader, such as a hard disc drive HDD 203; a first communication interface 204 for communicating via the first communication network 100; and optionally a second communication interface 205 for communicating via the second communication network 120.

The processor 200 is capable of executing instructions loaded in the RAM 201 from the ROM 202, an external memory (not shown), a storage medium such as the HDD 203, or a communication network. When the server 101 is powered up, the processor 200 is capable of reading instructions from the RAM 201 and executing them. These instructions form a computer program causing the implementation, by the processor 200, of all or some of the algorithms and steps described hereafter. All or some of the algorithms and steps described hereafter may be implemented in software form by execution of a set of instructions by a programmable machine, such as a DSP (Digital Signal Processor) or a microcontroller, or be implemented in hardware form by a machine or dedicated component, such as an FPGA (Field-Programmable Gate Array) or an ASIC (Application-Specific Integrated Circuit).

FIG. 3 schematically illustrates a message exchange occurring in the system of FIG. 1A or 1B.

In a step 301, the client 110 connects to the first communication network 100. The client 110 builds a request aimed at discovering the servers connected to the first communication network 100. In the context of the UPnP protocol, this request takes the form of an M-SEARCH message formatted according to the HTTP protocol (Hypertext Transfer Protocol as defined in the standard document RFC 2616), encapsulated in a UDP (User Datagram Protocol, as defined in the standard document RFC 768) datagram intended for the IP address 255.255.255.250 and the UDP port 1900.

In a step 302, the client 110 sends a request via the first communication network 100. This request is received by a server 102 (not shown in FIGS. 1A and 1B) in a step 303, and by the server 101 in a step 306. Indeed, the request being broadcast to an IP address and a UDP port to which each of the servers subscribes according to the UPnP protocol, the request is received by each of the servers connected to the first communication network 100.

In the step 303, the server 102 builds a response to the request sent by the client 110, in which it indicates its presence on the communication network 100. According to the UPnP protocol, the response takes the form of a UDP datagram addressed to the client 110, the IP address of which is extracted from the request. The response specifies a URL (Uniform Resource Locator) from which a service description implemented by the server 102 is accessible. In a step 304, the server 102 sends this response over the communication network 100. This response is received and processed by the client 110 in a step 305.

In the step 306, the server 101 also builds a response to the request sent by the client 110, in which it indicates its presence on the communication network 100. In the same way, the response specifies a URL from which a description of any services provided to the client 110 by the server 101 is accessible. In order to determine which service description to provide to the client 110, the server 101 obtains in advance the type of the client 110. According to the type of the client 110, and according to predetermined rules within the server 101, the server 101 selects the services to present in this description.

The predetermined rules within the server 101 associate, for a type of client, at least one service provided by the server 101 via the first communication network. The predetermined rules may be predefined; for example they are factory parameters embedded when the server 101 was manufactured. These rules may be updated by the operator providing Internet access via the second communication network 120, or via storage means to be read by the server 101. For example, when the server 101 is a residential gateway, the predetermined rules define that a client of PC type can access only the interface DATA and that the server consequently exports thereto only the services that relate to the interface DATA. According to another example, the predetermined rules define that a client of audiovisual decoder type can access only the interfaces DATA and TV and that a client of telephone type can access only the interfaces DATA and TEL; the server 101 generates the service description accordingly, meaning according to the type of the client to which it is addressed. Other types of client and other rules may be defined.

In order to obtain the type of the client 110, the server 101 may rely on the MAC (Medium Access Control) address of the Ethernet frames in which the UDP and/or TCP requests are encapsulated. This MAC address enables identifying the manufacturer of the client, which may give an indication of the type of the client. The server 101 may also be based on lookup tables between MAC addresses and client types, updated during a phase of initialisation of the server 101. For example, the user can indicate such a correspondence to the server 101, or connect the clients one after the other, indicating after connection the type of the client, so that the server 101 can build this correspondence. In order to obtain the type of the client 110, the server 101 may also rely on options included in messages according to the DHCP (Dynamic Host Configuration Protocol, as defined in the standard document RFC 2131) format exchanged over the first communication network 100. The server 101 may also rely on a detection of sequences of Ethernet, IP, TCP and/or UDP frames, exchanged over the communication network and revealing the type of the device that sent them. Failing any contrary information, the server 101 may associate a client with a predefined type, for example PC type.

In a particular embodiment, the server 101 receives, via the second communication network 120, information indicating the type of at least one client connected to the first communication network 100. Taking again the example where the server 101 is an interconnection device or a residential gateway, a client of audiovisual decoder type would connect to servers of the operator providing Internet access which are connected to the second communication network 120. An SSL (Secure Sockets Layer, as defined in the standard document RFC 6101) or TLS (Transport Layer Security, as defined in the standard document RFC 5246) connection is then established between the client and the operator via the residential gateway, which enables the client to declare itself to the server of the operator. The server of the operator can thus retrieve an identifier of the client, such as its MAC address. The server of the operator can then inform the residential gateway of this identifier and indicate thereto the type of the client.

In a step 307, the server 101 sends the response, built at the step 306, via the communication network 100. This response is received and processed by the client 110 in a step 308.

Considering that the client 110 is interested in obtaining the list of services provided by the server 101, the client 110 builds a request aimed at obtaining this list of services. According to the UPnP protocol, the response takes the form of an HTTP GET message referring to the URL supplied by the server 101 and encapsulated in one or more TCP (Transmission Control Protocol, as defined in the standard document RFC 793) frames addressed to the server 101. In a step 309, the client 101 sends the request via the first communication network 100. This request is received by the server 101 in a step 310.

In the step 310, the server 101 builds a response to this request. The response comprises the description of each service selected at the step 306. If no service corresponds to the type of the client 110, the response comprises an error code.

In a step 311, the server 101 sends this response via the communication network 100. This response is received and processed by the client 110 in a step 312. Thus the client 110 obtains only a description of each service that it is authorised to access. The processing performed by the server 101 with regard to access to a service by a client is detailed hereafter in relation to FIG. 5.

In a particular embodiment, the server 101 shall periodically announce the services that it provides via the first communication network 100. This depends on the service discovery protocol implemented between the servers and clients; such is the case for example with the UPnP protocol. This aspect is detailed hereafter in relation to FIG. 4.

In another particular embodiment, a client may request a deactivation of services from the server 101. When it receives such a request, the server 101 determines what is the type of the client that send the request and deactivates the services that the client is authorised to access, according to the predetermined rules within the server 101, from to its type. When the server 101 is adapted to periodically announce the services that it provides via the first communication network 100, the server 101 stops sending such announcements. The other services of the server 101 remain accessible to the clients and a service description is provided thereto by the server 101 upon request, in the same way as at the steps 308 to 312. This allows partial deactivation of the services of the server 101, and this enables in particular, in the context of the example of the residential gateway already mentioned, to deactivate only the concerned interface. The user can thus deactivate the services related to the interface TEL without deactivating the services related to the interface TV.

FIG. 4 schematically illustrates a service announcement algorithm. The algorithm is implemented by the server 101.

In a step 401, the server 101 determines each service, among the services that the server 101 provides via the first communication network 100, accessible to all the clients connected to the first communication network 100. To do this, the server 101 determines the type of each of the clients connected to the first communication network and determines the services to be exported according to said predetermined rules and the types of the clients. The server 101 then builds a description limited to the services accessible in common.

In a step 402, the server 101 announces these services to the clients connected to the first communication network 100 by broadcasting this description. This announcement can be performed periodically or pseudoperiodically, for example every two to three minutes. According the UPnP protocol, such an announcement takes the form of a message NOTIFY formatted according to the HTTP protocol, encapsulated in a UDP datagram intended for the IP address 255.255.255.250 and for the UDP port 1900.

FIG. 5 schematically illustrates an algorithm for processing an access request for accessing to a service. The algorithm is implemented by the server 101.

In a step 501, the server 101 receives an access request for accessing to a service. In a following step 502, the server 101 determines the type of the client from which the request is received.

In a following step 503, the server 101 checks whether the type of the client complies, according to the predetermined rules within the server 101, with the service to which the request relates. If such is the case, in a step 504, the server 101 enables the client to access the service to which the request relates. Otherwise, in a step 505, the server 101 does not enable the client to access the service to which the request relates and transmits to the client a response comprising an error code notifying rejection. According to the UPnP protocol, the request and the response take the form of messages according to the SOAP (Simple Object Access Protocol) format encapsulated in one or more TCP frames addressed to the server 101.

The invention claimed is:

1. A service provider device configured for providing at least one service in a first communication network to at least one client connected to said first communication network, said service provider device announcing each service as a set of functionalities that said service provider device offers in the first communication network as well as a set of rules controlling use of said functionalities, said service provider device comprising a processor configured for:
    obtaining, by the service provider device, for each client present in said first communication network, a type of client, wherein the type of client represents functionalities implemented by said client; and
    selecting among said at least one service provided by said service provider device only the service(s) that correspond to the type of at least one respective client to which a service description is configured to be exported via said first communication network; and
    exporting, to the client, said service description via said first communication network, said service description describing only said selected service(s) so that the respective client obtains only a description of each service it is authorized to access.

2. The service provider device according to claim 1, wherein said service provider device is configured for building said description according to predetermined rules associating, for a type of client, at least one service from said service(s).

3. The service provider device according to claim 2, wherein said service provider device is configured for:
    determining the type of each client connected to the first communication network;
    determining, according to said predetermined rules, each service associated with all the types of client connected to the first communication network;
    building said service description, said service description being limited to said determined service(s); and broadcasting, via the first communication network, the built service description.

4. The service provider device according to claim 2, wherein said service provider device is configured for:
   receiving an access request for accessing to a said service;
   determining the type of the client that sent said access request; and
   deciding whether or not to authorise said client to have access to said service, according to said predetermined rules and said type of said client.

5. The service provider device according to claim 2, wherein said service provider device is further configured for:
   receiving a service deactivation request for deactivating the services provided by said service provider device;
   determining the type of the client that sent said service deactivation request; and
   deactivating, in response to said service deactivation request, the services associated, in accordance with said predetermined rules, with said type of said client.

6. The service provider device according to claim 1, wherein said service provider device is further configured for:
   receiving a request for service description;
   determining the type of the client that sent said request for service description;
   building said service description according to said type of the client; and
   transmitting the built service description, in response to said request.

7. The service provider device according to claim 1, wherein, the service provider device being configured for obtaining, for each client, the type of the client comprises the service provider device being configured for determining the type of at least one client according to:
   MAC addresses in Ethernet frames exchanged via the first communication network; and/or
   options included in DHCP messages exchanged via the first communication network; and/or
   sequences of frames exchanged via the first communication network.

8. The service provider device according to claim 1, wherein said service provider device is an interconnection device or is configured to be integrated in an interconnection device, said interconnection device being configured to interconnect said first communication network with a second communication network, each service being related to an interface of said interconnection device with said second communication network.

9. The service provider device according to claim 8, wherein said service provider device is further configured for receiving, via the second communication network, information indicating the type of at least one client connected to said first communication network.

10. The service provider device according to claim 1, wherein said services are in accordance with the UPnP standard.

11. A method for providing at least one service in a communication network to at least one client connected to said communication network, a service provider device announcing each service as a set of functionalities that said service provider device offers in the first communication network as well as a set of rules controlling use of said functionalities, wherein the service provider device performs:
   obtaining, by the service provider device, for each client present in said first communication network, a type of client, wherein the type of client represents functionalities implemented by said client;
   selecting among said at least one service provided by said service provider device only the service(s) that correspond to the type of at least one respective client to which a service description is configured to be exported via said first communication network; and
   exporting, to the client, said service description via said first communication network, said service description describing only said selected services(s) so that the respective client obtains only a description of each service it is authorized to access,
   when said computer program instructions are executed by a processor of said service provider device.

12. A non-transitory information storage medium comprising computer program instructions enabling a service provider device to perform a method for providing at least one service in a communication network to at least one client connected to said communication network, said service provider device announcing each service as a set of functionalities provided that the service provider device offers in the first communication network as well as a set of rules controlling use of said functionalities, wherein the method comprises:
   obtaining, by the service provider device, for each client present in said first communication network, a type of client, wherein the type of client represents functionalities implemented by said client;
   selecting among said at least one service provided by said service provider device only the service(s) that correspond to the type of at least one respective client to which a service description is configured to be exported via said first communication network; and
   exporting, to the client, said service description via said first communication network, said service description describing only said selected service(s) so that the respective client obtains only description of each service it is authorized to access,
   when said computer program instructions are executed by a processor of said service provider device.

* * * * *